Figure 3:
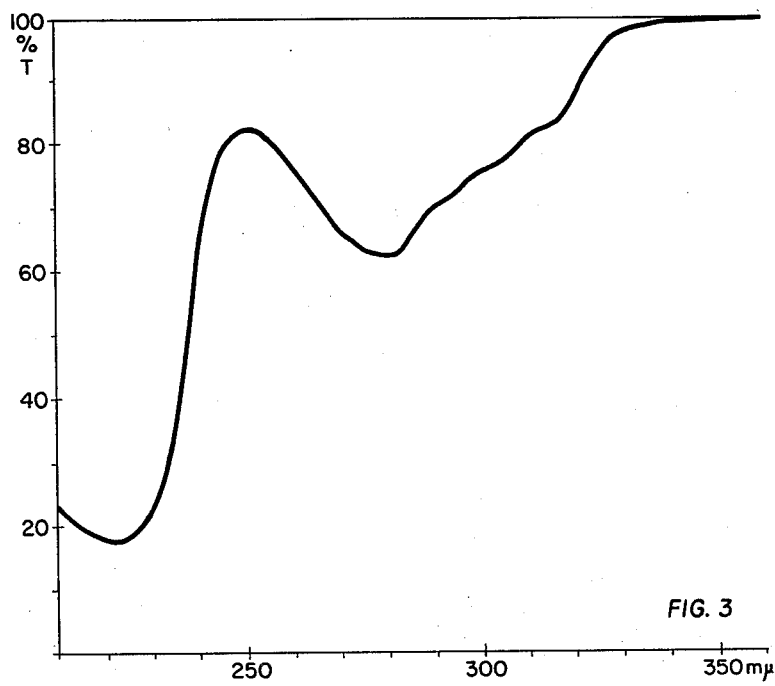

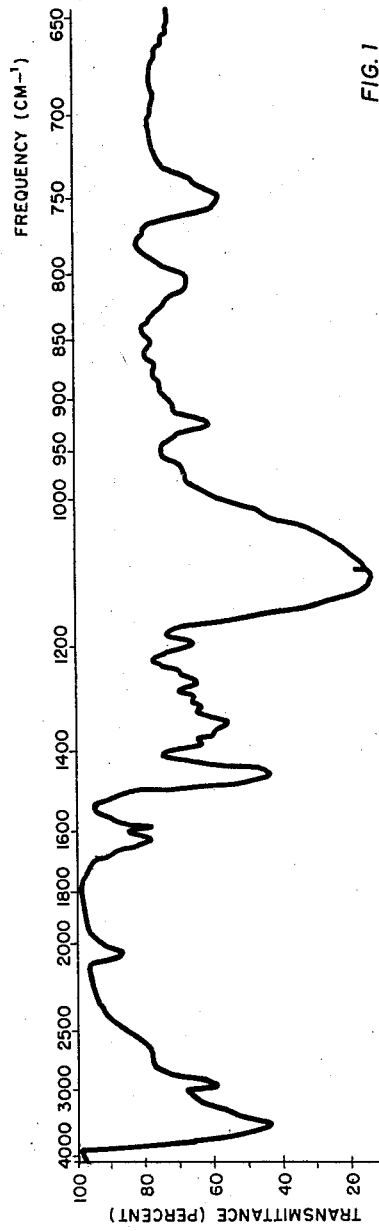
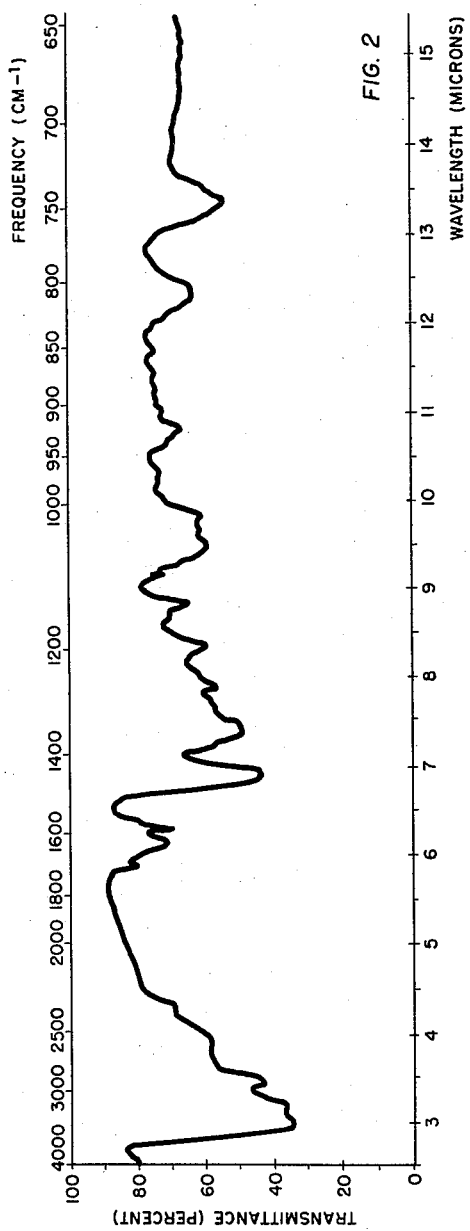

3,108,095
**HUNTERIA ALKALOID J AND THE OBTENTION THEREOF FROM *HUNTERIA EBURNEA***
Ulrich Renner, Riehen, near Basel, Switzerland, assignor to Geigy Chemical Corporation, Ardsley, N.Y., a corporation of Delaware
Filed Feb. 3, 1961, Ser. No. 86,957
Claims priority, application Switzerland Feb. 5, 1960
7 Claims. (Cl. 260—236)

The subject of the present invention is a process for the obtention, in enriched or pure form, of an alkaloid which has not been known up to now from plants of the genus Hunteria, in particular from the roots and bark of *Hunteria eburnea* Pichon.

It is known that aqueous total extracts from *Hunteria eburnea*, chiefly from the roots thereof, cause a marked and long-lasting hypotension. (Raymond-Hamet, Compt. rend. 240, 1470 (1955); A. Engelhardt and H. Gelbrecht, Naturwiss. 45, 547 (1858)).

Up to now, four alkaloids, Eburnamine, Isoeburnamine, Eburnamenin and Eburnamonin, have been isolated in pure form from *Hunteria eburnea*, see M. F. Bartlett, W. I. Taylor and Raymond-Hamet, Compt. rend. 249, 1259 (1959). However, these can be termed quite definitely as alkoloids of secondary importance. The content of the roots and bark of Eburnamine is, for example, about 0.03–0.05% and the other known alkaloids are contained therein in even much smaller amounts. No hypotensive activity could be demonstrated for these tertiary alkaloids obtainable by the usual methods known to the art.

It has now been found that the stem and root barks of *Hunteria eburnea* contain yet other alkaloids in amounts considerably exceeding those of the known constituents, which new alkaloids possess the therapeutically useful properties of the plant. As free bases, they are practically insoluble in the solvents usually used for extraction and they are readily destroyed by air oxidation so that it is not possible to obtain them in pure and crystalline form by the usual processes described up to now. It is possible, however, to isolate as a crystalline salt a hypotensive pure alkaloid, referred to in the following as Hunteria alkaloid J, by the process according to the invention described in the following.

According to the findings of this invention, ground and dried parts of plants of the genus Hunteria, in particular stem and root barks of *Hunteria eburnea* Pichon, are extracted with water or with a low molecular alkanol containing 1–3 carbon atoms which is miscible with water, the extraction being made with the possible addition of an organic acid such as a lower fatty acid containing 1–3 carbon atoms, e.g. up to 1% acetic acid. The extract is concentrated in vacuo and the extraction residue is diluted with water or with a dilute aqueous acid, e.g. sulphuric acid or, preferably, a fatty acid containing 1–3 carbon atoms. An aqueous solution of picric acid, perchloric acid or nitric acid or of their alkali metal salts is added to the acid, aqueous solution which has been clarified if necessary by filtration, the precipitate formed is removed and dissolved in methanol or in aqueous acetone. The solution obtained is treated with an anion exchanger in the chloride form and is concentrated in vacuo, possibly after the addition of water, until the organic solvent is removed. Now, if to the remaining aqueous solution of the hydrochlorides of the crude bases is added at most one half, advantageously one third of the amount of an inorganic base, for example sodium hydroxide, potassium hydroxide, preferably sodium bicarbonate or ammonia, necessary to completely liberate said crude bases from their hydrochloride salts, a precipitate is obtained which comprises the already known alkaloids. This precipitate is filtered off and an inorganic base, e.g. sodium carbonate or sodium bicarbonate, is then added to the filtrate until the organic bases remaining therein and comprising Hunteria alkaloid J have completely precipitated. Said precipitate comprising Hunteria alkaloid J is filtered off and, if desired, is washed with benzene or chloroform. The alkaloid fraction comprising Hunteria alkaloid J so obtained is dissolved in dilute acetic acid whereupon at most half, advantageously about one quarter of the amount of perchloric acid necessary to cause complete precipitation is added and the precipitate formed is filtered off. An excess of perchloric acid is then added to the filtrate, the precipitated perchlorates are separated and crystallised from methanol, whereby the perchlorate of Hunteria alkaloid J is obtained in crystalline form. If desired, the perchlorate of Hunteria alkaloid J so obtained is converted in a known manner, e.g. by double decomposition or, preferably, by treatment with an ion exchanger, e.g. by filtering the perchlorate dissolved in a lower alkanol over an ion exchange column and washing out the column with a lower alcohol, into water soluble, therapeutically acceptable salts such as, e.g. the hydrochloride, phosphate, sulphate, methyl sulphate, camphor sulphonate, lactate, fumarate, tartrate or citrate. Suitable ion exchangers are strongly basic anion exchangers in the chloride form, e.g. Amberlite IRA-400 and 401, Dowex-1 and 2, Lewatit MII etc.

Hunteria alkaloid J consisting of carbon, hydrogen, nitrogen and oxygen, which has been unknown up to now, is characterised by the properties of the following salts obtained according to the invention:

PERCHLORATE OF HUNTERIA ALKALOID J

Colourless prisms from methanol,
Melting point: 279–281° C. (with decomposition),
Specific rotation: $[\alpha]_D^{23} = +29.4°$ ($c=1$ in methanol),
Acidity constant: $pK_{MCS}$ 6.50 in methyl Cellosolve/water (4:1),
Solubility: readily soluble in warm methanol and warm ethanol sparingly soluble in cold methanol and cold ethanol, almost insoluble in water, acetone, ether, chloroform.

*Elemental analysis.*—Found: C, 57.85 and 57.97%; H, 6.45 and 6.45%; N, 7.17%.
Molecular composition calculated from elemental analysis:
$C_{39}H_{50}Cl_2N_4O_{10} \pm CH_2$, i.e. $(C_{39}H_{48}N_4O_2 \pm CH_2) \cdot 2HClO_4$

*Group analysis.*—$OCH_3$ according to Zeisel: found 0%; $NCH_3$ according to Herzig-Meyer: found 1.57% $CH_3$; $C—CH_3$ according to Kuhn-Roth: found: 2.46% $CH_3$; $C—C_2H_5$ according to Bickel-Schmid-Karrer.

Found: positive
Ultraviolet spectrum: in methanol, see FIG. 3 (con.: 9.80 mg./litre, thickness of layer 1 cm.) maxima at 222 m$\mu$ (log $\epsilon=4.46$); 280 m$\mu$ (log $\epsilon=3.90$); shoulders at 292, 305 and 315 m$\mu$, indicative of 2,3-disubstituted indole moiety.
Infra-red spectrum: in potassium bromide, see FIG. 1 (about 0.5 mg. substance in potassium bromide, pressed to a tablet of 12×4 mm.)
Interpretation of peaks: 9.13 m$\mu$—$ClO_4$—13.37 m$\mu$—1,2-disubstituted phenyl.

HYDROCHLORIDE OF HUNTERIA ALKALOID J

Slightly hygroscopic colourless small needles from methanol/acetone.
Melting point: 310–315° C. (with decomposition)
Specific rotation: $[\alpha]_D^{23} = +27.3°$ ($c=1$ in methanol), Acidity constant: $pK_{MCS}$ 6.56 in methyl Cellosolve/water (4:1), Solubility: readily soluble in water, methanol, ethanol at room temperature, sparingly soluble in acetone, almost insoluble in ether, chloroform.

*Elemental analysis.*—Found C, 65.66 and 65.94%; H, 7.22 and 7.22%; N, 7.61%; Cl, 9.72%.

Molecular composition calculated from elemental analysis:

$C_{39}H_{54}Cl_2N_4O_4 \pm CH_2$, i.e.

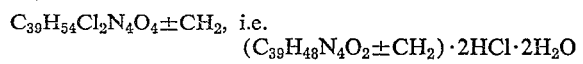

$(C_{39}H_{48}N_4O_2 \pm CH_2) \cdot 2HCl \cdot 2H_2O$

*Group analysis.*—$OCH_3$ according to Zeisel: found 0%; $NCH_3$ according to Herzig-Meyer: found: 2.0% $CH_3$; $CCH_3$ according to Kuhn-Roth: found: 2.07% $CH_3$; $C—C_2H_5$ according to Bickel-Schmid-Karrer. Found: positive.

Figure 4:
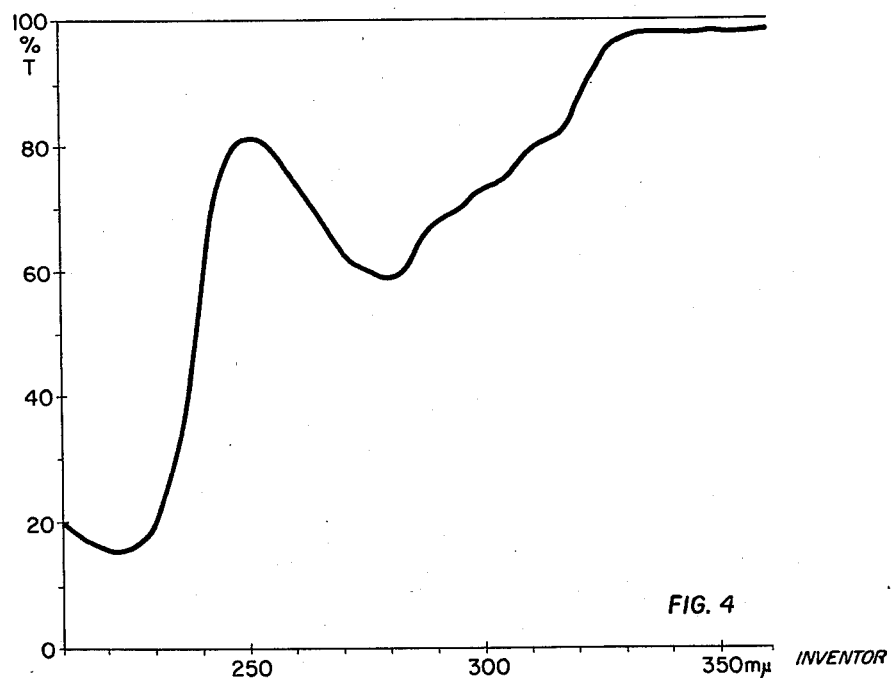

Ultraviolet spectrum: in methanol, see FIG. 4 (conc. 9.88 mg./litre, thickness of layer 1 cm.) maxima at 222 m$\mu$ log $\epsilon$=4.44); 279 m$\mu$ (log $\epsilon$=3.89); shoulders at 294, 304, 315 m$\mu$, indicative of 2,3-disubstituted indole moiety.

Infra-red spectrum: in potassium bromide, see FIG. 2 (about 0.5 mg. substance in potassium bromide, pressed to a tablet of 12×4 mm.).

Interpretation of peaks: 2.94, 3.12, 6.15 $\mu$: OH, NH, $H_2O$; 3.87, 4.25 $\mu$: "ammonium" peaks. 13.41 $\mu$: 1,2-disubstituted phenyl.

*Colour reaction.*—with Keller's reagent there is first a pale red, later a blue violet colour.

*Rf-value.*—0.75 in ethyl acetate/tert. butanol/water (4:2:1) on Whatman No. 1.

On test animals (cat) in doses of 3–5 mg./kg. i.v., the hydrochloride reduces the arterial blood pressure for longer than one hour and is suitable, therefore, for the treatment of forms of hypertension. Other water soluble salts of the Hunteria alkaloid J with physiologically acceptable acids can be used in the same way. In higher dosages, the salts also have a muscle-relaxing action.

In the following examples, parts are given as parts by weight. Their relationship to parts by volume is as that of grammes to cubic centimeters. The temperatures are given in degrees centigrade.

*Example 1*

1000 parts of ground root bark of *Hunteria eburnea* are percolated with about 10,000 parts by volume of methanol which contains 0.5% glacial acetic acid. The extract is concentrated in vacuo to 1500 parts by volume, diluted with the same volume of water and the remaining methanol is distilled off in vacuo. The aqueous solution which remains is clarified by filtering over kieselguhr (Hyflo) and is added to 3000 parts by volume of a stirred saturated aqueous picric acid solution. The picrates which precipitate are filtered off under suction, dissolved in 2000 parts by volume of 50% aqueous acetone and filtered over an ion exchange column containing Amberlite IRA 400 in the Cl⁻ form (5×50 cm.). The filtrate is concentrated in vacuo to about 1000 parts by volume and a saturated solution of 6.5 parts of sodium bicarbonate is added while stirring. The precipitate formed is filtered off and an excess of saturated sodium bicarbonate solution is added to the filtrate. The precipitate thus formed is filtered off, dissolved in 300 parts by volume of 2 N-acetic acid and to the stirred solution, 7 parts by volume of a 20% perchloric acid solution are added dropwise. The precipitate formed is filtered off, and an excess of 20% perchloric acid is added to the filtrate until complete precipitation occurs. The perchlorates which have now precipitated are filtered off under suction and crystallised from methanol; after recrystallisation from methanol, the pure perchlorate of the alkaloid J is obtained as colourless prisms which melt at 279–281°; $[\alpha]_D$+29.4° (in methanol). Elementary analysis gives the following values: C, 57.85; 57.97%; H, 6.45; 6.45%; N, 7.17%.

*Example 2*

3000 parts of ground barks of *Hunteria eburnea* are percolated with about 25,000 parts by volume of methanol, the extract is concentrated in vacuo to about 2000 parts by volume, diluted with 4000 parts by volume of 2 N-acetic acid and the remaining methanol is distilled off in vacuo. An excess of 20% perchloric acid is added to the aqueous solution and the perchlorates which precipitate are filtered off. The crude perchlorates are dissolved in about 2000 parts by volume of methanol and the solution is filtered over an ion exchange column containing Amberlite IRA 400 in the Cl⁻ form (5×70 cm.). The filtrate is concentrated in vacuo to about 500 parts by volume, diluted with 1000 parts by volume of water and the remaining methanol is distilled off in vacuo. A saturated solution of 6 parts of sodium bicarbonate is added to the aqueous solution which remains, it is filtered and the pH of the filtrate is adjusted to about 8 with an excess of saturated sodium bicarbonate solution. The bases which precipitate are filtered off under suction, extracted with about 300 parts by volume of cold chloroform and the portions which are insoluble in chloroform are dissolved in 500 parts by volume of 2 N-acetic acid. About 12 parts by volume of a 20% perchloric acid solution are added to the solution while stirring; the precipitate formed is filtered off and an excess of perchloric acid is added to the filtrate until complete precipitation occurs. The perchlorates which have now precipitated are filtered off under suction and crystallised from methanol. A product melting at 275–278° (with decomposition) is obtained. This product is identical with the perchlorate of Hunteria alkaloid J described in Example 1.

*Example 3*

2.4 parts of the perchlorate of Hunteria alkaloid J are dissolved in 250 parts by volume of methanol, the solution is filtered over an ion exchange column containing Amberlite IRA 400 in the Cl⁻ form and the column is washed out with 100 parts of methanol. The hydrochloride which remains as evaporation residue of the filtrate, is easily soluble in water, methanol and ethanol and it crystallises from methanol/acetone into small colourless needles which melt at 310–315° (with decomposition); $[\alpha]_D$+27.5° (in methanol). Elementary analysis gave the following values: C, 65.66; 65.94%; H, 7.22; 7.22%; N, 7.61; Cl, 9.72%.

What I claim is:

1. Process for the obtention of the perchlorate of Hunteria alkaloid J from *Hunteria eburnea* Pichon plants, characterised by extracting the ground plant material with a member selected from the group consisting of water and alkanol with 1 to 3 carbon atoms, concentrating the extract in vacuo, diluting the extract residue with a member selected from the group consisting of water and a dilute aqueous acid selected from the group consisting of sulfuric acid and lower fatty acid with 1 to 3 carbon atoms, adding an aqueous solution of a member selected from the group consisting of picric acid, perchloric acid and nitric acid and of the alkali metal salts thereof, to the clarified acid aqueous solution, separating the precipitate formed, dissolving it in a solvent selected from the group consisting of methanol and aqueous acetone, treating the solution with a strongly basic anion exchanger loaded with chloride ions and concentrating in vacuo, until the organic solvent has been removed, adding at most half the amount of an inorganic base which is necessary to complete precipitation of the bases to the remaining aqueous solution of the hydrochlorides of the crude bases, filtering off the liberated organic bases, adding an inorganic base to the filtrate until complete precipitation of the organic bases occurs, filtering off the bases thus precipitated, dissolving the fraction containing the bases so obtained in dilute acetic acid, adding to the solution at most half the amount of perchloric acid necessary to attain complete precipitation, filtering off the precipitate so obtained, adding an excess of perchloric acid to the filtrate, isolating the precipitated perchlorates and crystallising them from methanol.

2. Process for the obtention of a water soluble, therapeutically acceptable salt, characterised by preparing the perchlorate of Hunteria alkaloid J according to claim 1 and subsequently converting the perchlorate of Hunteria alkaloid J so obtained with a strongly basic ion exchanger loaded with chlorine ions into said therapeutically acceptable salt.

3. Process according to claim 1, characterised by extracting the ground plant material with a member selected from the group consisting of water and a lower alkanol with 1 to 3 carbon atoms, with the addition of lower fatty acid with 1 to 3 carbon atoms.

4. Process according to claim 1, characterised by performing the concentration in vacuo after the addition of water.

5. Process according to claim 1, characterised by washing the precipitated organic bases with a member selected from the group consisting of benzene and chloroform before dissolving them in dilute acetic acid.

6. The perchlorate of Hunteria alkaloid J which melts at 279–281° C. and has the following properties: specific rotation $[\alpha]_D^{23} = +29.4°$ ($c=1$ in methanol); acidity constant $pK_{MCS} = 6.50$ in methyl Cellosolve/water (4:1); readily soluble in warm methanol and warm ethanol, sparingly soluble in cold methanol and cold ethanol, essentially insoluble in water, acetone, ether, chloroform; molecular composition calculated from elemental analysis $(C_{39}H_{48}N_4O_2 \pm CH_2).2HClO_4$; ultraviolet spectrum in methanol as shown in FIG. 3; and infra-red spectrum in potassium bromide as shown in FIG. 1.

7. The hydrochloride of Hunteria alkaloid J which melts at 310–315° C. and has the following properties: specific rotation $[\alpha]_D^{23} = +27.3°$ ($c=1$ in methanol); acidity constant $pK_{MCS}$ 6.56 in methyl Cellosolve/water (4:1); readily soluble in water, methanol and ethanol at room temperature, sparingly soluble in acetone, almost insoluble in ether and chloroform; molecular composition calculated from elemental analysis $$(C_{39}H_{48}N_4O_2 \pm CH_2).2HCl.2H_2O$$

ultraviolet spectrum in methanol as shown in FIG. 4; and infra-red spectrum in potassium bromide as shown in FIG. 2.

References Cited in the file of this patent

UNITED STATES PATENTS 2,963,475     Bartlett et al. _____ Dec. 6, 1960

OTHER REFERENCES

Degering, Outline of Organic Nitrogen Compounds, University Lithoprinters, Ypsilanti, Michigan (1950), pages 580 and 582.

Willaman et al.: Economic Botany, volume 9, No. 2 (1955), pages 141–148.

Raymond-Hamet: Compte Rendu, volume 240 (1955), pages 1470–1472.

Berggren et al.: Acta Chemica Scandinavica, volume 12 (1958), 1521–1527.